United States Patent [19]

Brayman et al.

[11] 3,994,779
[45] Nov. 30, 1976

[54] NUCLEAR REACTOR FUEL ROD SPACER

[75] Inventors: Kenneth Wood Brayman, San Jose, Calif.; Donald Keith George, Wilmington, N.C.; James Charles Rawlings; Gary Errol Dix, both of San Jose, Calif.

[73] Assignee: General Electric Company, San Jose, Calif.

[22] Filed: Mar. 7, 1975

[21] Appl. No.: 556,560

[52] U.S. Cl. .................................. 176/78; 176/76
[51] Int. Cl.² ........................................ G21C 3/36
[58] Field of Search ............................... 176/76, 78

[56] References Cited
UNITED STATES PATENTS

| | | | |
|---|---|---|---|
| 3,350,275 | 10/1967 | Venier et al. | 176/76 X |
| 3,375,172 | 3/1968 | Mansson et al. | 176/78 X |
| 3,644,924 | 5/1972 | Krawiec | 176/78 |
| 3,674,635 | 7/1972 | Anthony et al. | 176/76 X |
| 3,770,582 | 11/1973 | Rogell | 176/78 |
| 3,791,466 | 2/1974 | Patterson et al. | 176/78 |
| 3,852,154 | 12/1974 | Carlson et al. | 176/78 |
| 3,904,475 | 9/1975 | Tashima | 176/78 |

*Primary Examiner*—Samuel W. Engle
*Assistant Examiner*—Peter A. Nelson
*Attorney, Agent, or Firm*—Ivor J. James, Jr.; Samuel E. Turner; Sam E. Laub

[57] ABSTRACT

A spacer for positioning at least the four corner fuel rods in a tubular flow channel of a nuclear reactor is disclosed. The spacer comprises a support member having four side bands interconnected by four corner bands to form a unitary structure. Each of the side bands has a L-shaped lobe adjacent each of its ends with one leg of each lobe extending to the adjacent end of its side band. Each of the corner bands is narrower than the side bands and is offset so as to be spaced from the lobe. One leg of each lobe is positioned to engage the tubular flow channel to maintain proper spacing between the flow channel and the adjacent corner fuel rod and to improve the thermal-hydraulic performance of the spacer.

3 Claims, 7 Drawing Figures

PRIOR ART

NUCLEAR REACTOR FUEL ROD SPACER

BACKGROUND OF THE INVENTION

The release of large amounts of energy through nuclear fission reactions is now quite well known. In general, a fissionable atom such as $U^{233}$, $U^{235}$, $Pu^{239}$, or $Pu^{241}$ absorbs a neutron in its nucleus and undergoes a nuclear disintegration. This produces on the average two fission products of lower atomic weight and great kinetic energy, and several fission neutrons also of high energy.

The kinetic energy of the fission products is quickly dissipated as heat in the nuclear fuel. If after this heat generation there is at least one net neutron remaining which induces a subsequent fission, the fission reaction becomes self-sustaining and the heat generation is continuous. The heat is removed by passing a coolant through heat exchange relationship with the fuel. The reaction may be continued as long as sufficient fissionable material exists in the fuel to override the effects of the fission products and other neutron absorbers which also may be present.

In order to maintain such fission reaction at a rate sufficient to generate useful quantities of thermal energy, nuclear reactors are presently being designed, constructed, and operated in which the fissile material (nuclear fuel) is contained in fuel elements which may have various shapes, such as plates, tubes or rods. For convenience, these fuel elements will hereinafter be referred to as fuel rods. These fuel rods are usually provided on their external surfaces with a corrosion-resistant non-reactive cladding. The fuel rods are grouped together at fixed distances from each other in a coolant flow channel or region as a fuel assembly or bundle. A sufficient number of the fuel assemblies are arranged to form a nuclear reactor core capable of the self-sustained fission reaction discussed above.

A typical fuel assembly is formed, for example, by an 8 × 8 array of spaced fuel rods, the rods being several feet in length, approximately one-half inch in diameter and spaced from each other by a fraction of an inch. To prevent such elongated rods from touching one another, through bowing and vibration during reactor operation, it is necessary to retain the rods in spaced relation by a plurality of fuel rod spacers positioned along the length of the fuel rods.

A variety of fuel rod spacers have been proposed and used. For example, fuel rod spacers are shown in U.S. Pat. Nos. 3,350,275 and 3,654,077, both assigned to the assignee of the present invention. Although the fuel rod spacers disclosed and claimed in the aforementioned patents function as intended, the desirability of improving the spacing characteristics and the thermal-hydraulic performance of the spacer will be evident to those skilled in the art. During reactor operation, the flow channel is deformed outwardly by an internal-to-external pressure differential. The effect of this outward deformation is to permit the spacing between the corner fuel rod and the flow channel to be reduced. It is an object of the present invention to prevent this reduction in spacing from occurring. Also, the thermal or power generation capability of the fuel is limited by the capability of the coolant efficiently to conduct heat from the fuel rods. The heat conduction capability is, in turn, influenced by the geometry of the spacer. Thus, another object of the invention is a spacer which provides improved thermal performance.

SUMMARY OF THE INVENTION

Briefly stated, in accordance with one aspect of the invention, there is provided a spacer to position at least the four corner fuel rods within the tubular flow channel of a nuclear reactor. Specifically, the improved spacer includes the support member comprising four side bands interconnected by four corner bands to form a rigid unitary structure. Each of the side bands as a generally L-shaped lobe adjacent each of its ends with one leg of each lobe extending to the adjacent end of its side band. Each of the corner bands is narrower than the side bands and is offset so as to be spaced from the one leg of each of the lobes. With this arrangement, the one leg of each of the lobes is positioned to engage the tubular flow channel to maintain proper spacing between the flow channel and the adjacent corner fuel rod.

In a particular embodiment of the present invention, the other leg of each lobe is positioned in alignment with an intermediate fuel rod to define a coolant flow path around that fuel rod.

The L-shaped lobe also contributes to more optimum distribution of the coolant whereby the hydraulic characteristics of the spacer are improved.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in connection with the accompanying drawings, in which:

DESCRIPTION OF THE PREFERRED EMBODIMENT

Figure 1:
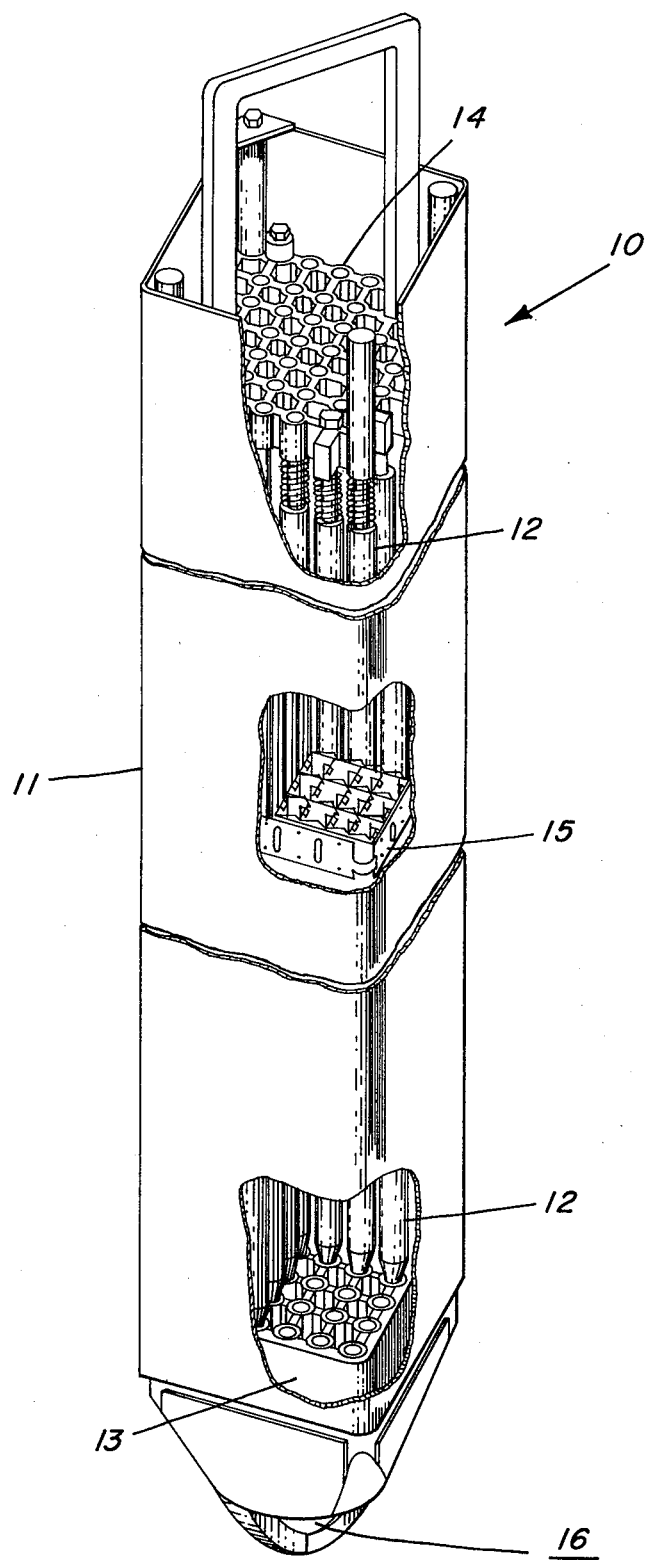
FIG. 1 is a perspective view, partly in section, of a fuel assembly incorporating fuel rod spacers of the present invention.

Referring now to the drawings, and initially to FIG. 1 thereof, there is illustrated a typical fuel assembly 10 comprising an open ended tubular flow channel 11 and a plurality of elongated fuel rods 12 supported between a lower tie plate 13 and an upper tie plate 14. The fuel rods 12 pass through a plurality of fuel rod spacers 15 which provided intermediate support to retain the elongated rods in spaced relationship to each other and to the flow channel 11 and to restrain fuel rods 12 from lateral vibration. A plurality of fuel assemblies 10 may be arranged in a lattice to form a reactor core (not shown) wherein a lower opening 16 of each fuel assembly 10 communicates with a supply plenum containing a coolant, such as water under pressure. The coolant thus flows through opening 16 and upward past fuel rods 12.

Figure 2:
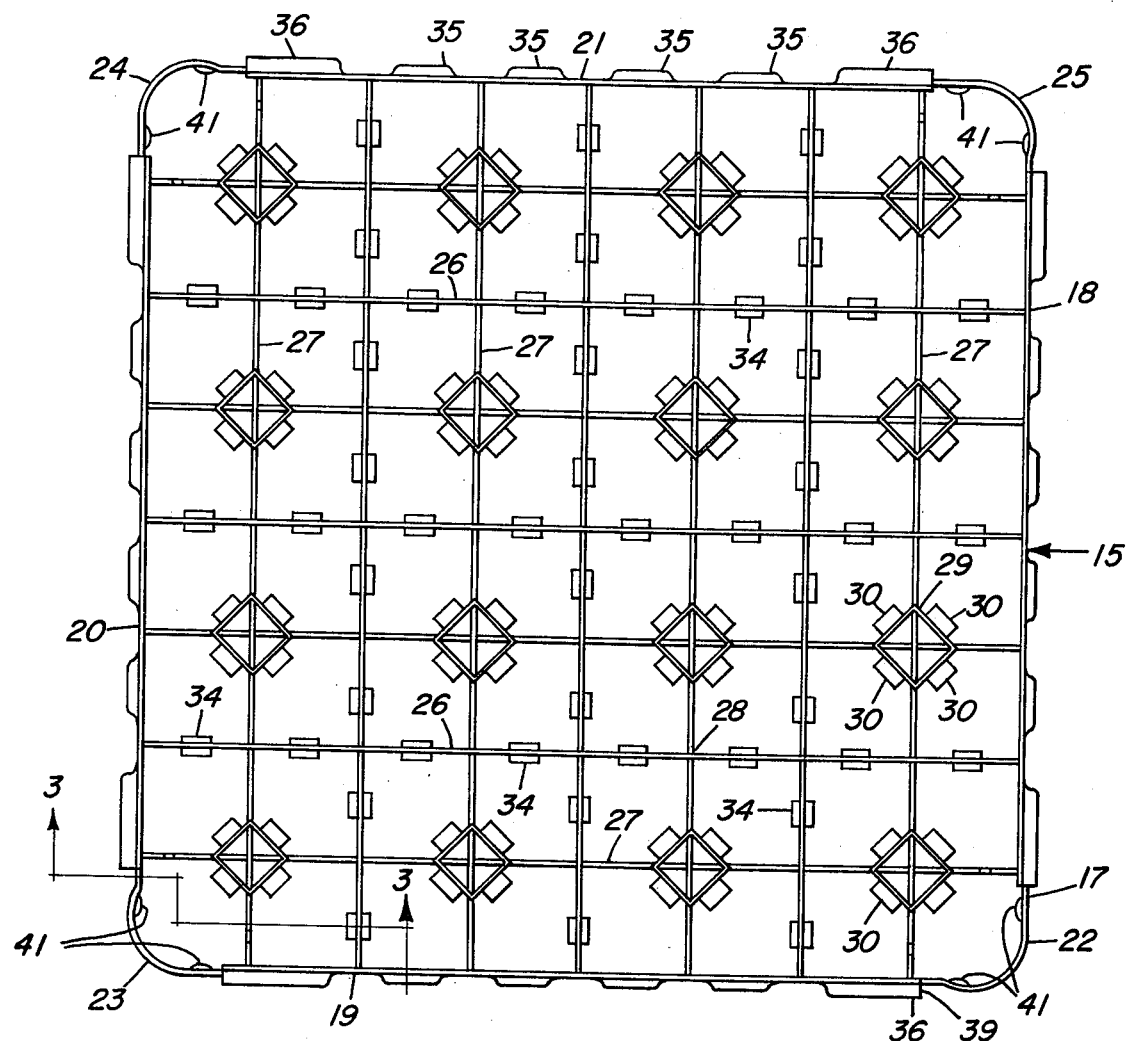
FIG. 2 is a plan view of one embodiment of a fuel rod spacer of the present invention.
Figure 3:
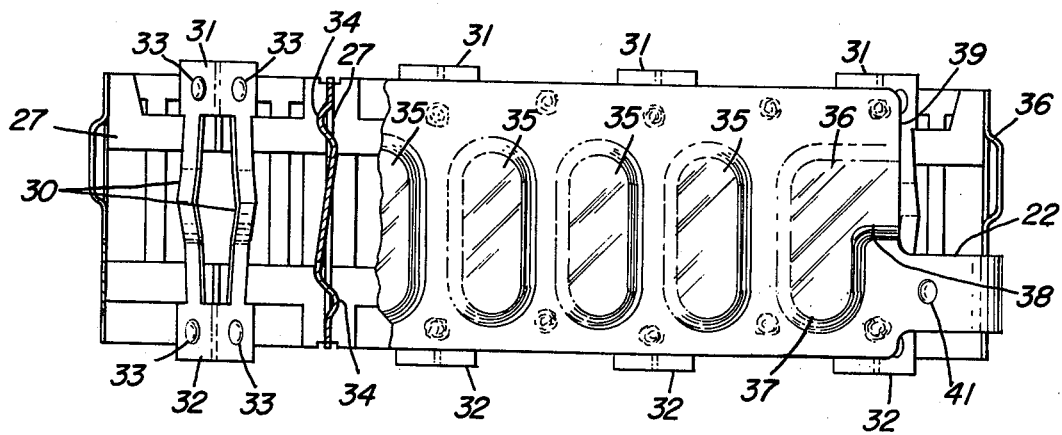
FIG. 3 is an elevational view, partly in section, of the fuel rod spacer of FIG. 2.

Turning now to FIGS. 2 and 3, the fuel rod spacer 15 is illustrated in greater detail. Fuel rod spacer 15 is formed of a peripheral support band 17 which comprises four side bands 18, 19, 20 and 21 interconnected by four corner bands 22, 23, 24 and 25 to form a rigid unitary generally rectangular structure. Disposed within peripheral support band 17 are a plurality of sheet metal divider members 26 and a plurality of sheet metal divider bars 27. Members 26 and bars 27 are rigidly secured between opposite side bands.

The divider bars 27 are arranged in vertically spaced pairs, each pair including an upper bar and a lower bar, with a first group of divider bars 27 supported between side band 18 and 20, and a second group of divider bars 27 supported between side bands 19 and 21, with the divider bars being arranged in alternate laterally spaced relation to divider members 26. The intersecting divider members and bars are slotted to interlock at the intersections thereof. This arrangement of intersecting divider members and bars provides a plurality of cubicles or fuel rod passages. Divider members 26 and divider bars 27 are preferably welded at their intersections, as at 28, for increased rigidity of the fuel rod spacer 15.

Supported at each intersection of two divider bars 27, is a four-sided spring assembly 29. Spring assembly 29 may be formed of suitable spring material such as Inconel-x. Spring assembly 29 is slotted along each corner thereof and each side is curved outwardly to form four outwardly extending spring members 30 supported between upper and lower end portions 31 and 32. Each of the four sides of each of end portions 31 and 32 is formed with an outwardly extending hemispherical protrusion 33 which serves to limit contact area with, and lateral movement of, the adjacent fuel rod in the event the spring member 30 fails. When assembled in spacer 15, spring assembly 29 receives the intersecting divider bars 27 through slots formed by the outwardly curving spring members 30. Thus, a resilient spring member 30 extends in a diagonal direction into each of the cubicies or fuel rod passages to resiliently force the individual fuel rods into engagement with a rigid projections 34 extending into each cubicle from divider members 26. The foregoing construction is described in greater detail in the aforementioned U.S. Pat. No. 3,654,077.

Each side band is formed with a plurality of outwardly extending lobes 35, one lobe adjacent the side of each of the side fuel rod passages. These lobes allow the flow of coolant around the side fuel rods and limit the contact area of these fuel rods with the side bands. The peripheral edges of the lobes are curved and sloped to prevent the formation of coolant vapor pockets.

In accordance with the present invention, L-shaped lobes 36 are provided adjacent the corners of fuel rod spacer 15. Each lobe 36 includes legs 37 and 38, with leg 38 exending to the end 39 of the side band in which the L-shaped lobe is formed. Leg 37 of lobe 36 is positioned in alignment with the fuel rod passage adjacent to the corner passage to define the coolant flow path around the fuel rod in that passage in a fashion similar to that of lobes 35.

Figure 4:
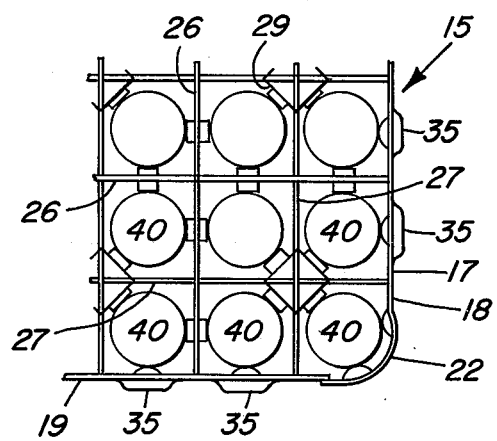
FIGS. 4, 5 and 6 illustrate a fuel rod spacer of the prior art.
Figure 5:
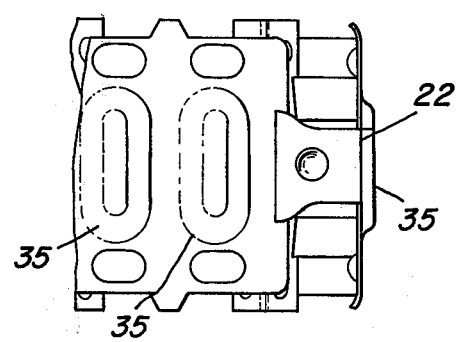
Figure 6:
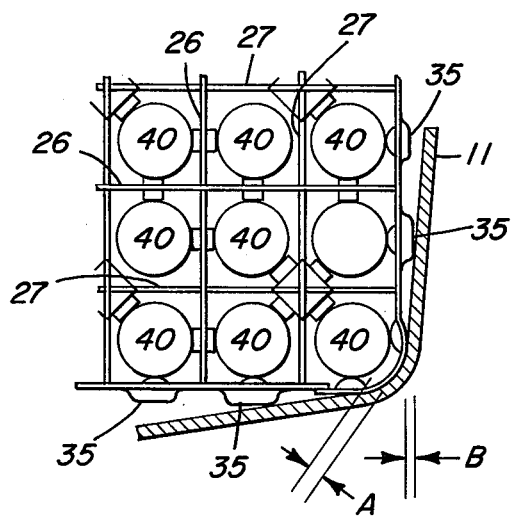
Figure 7:
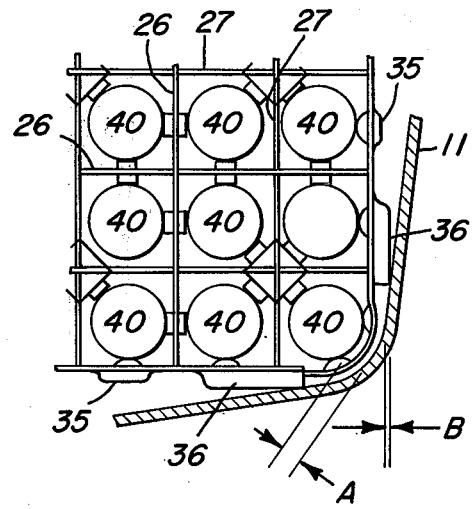
FIG. 7 is a fragmentary sectional view illustrating the efficacy of the present invention as compared to the prior art.

The exact function of L-shaped lobe 36 will be better understood by reference to FIGS. 4, 5 and 6 in which there are illustrated certain characteristics of the prior art. In FIGS. 4, 5 and 6, the elements have been given numbers corresponding to those set forth above in the discussions of FIGS. 2 and 3. In addition to those elements illustrated in FIGS. 2 and 3, FIGS. 4 and 6 show fuel rods 40 positioned in the fuel rod passages and FIG. 6 additionally shows a portion of flow channnel 11 in section. FIG. 6 illustrates a somewhat exaggerated (for the purposes of illustration) deformation of flow channel 11 created by the particular configuration and location of prior art lobes 35. Dimension A shows the fuel rod to channel clearance, and dimension B shows the fuel rod spacer displacemnt permitted by the prior art. The improvement afforded by the present invention is illustrated in FIG. 7 wherein dimensions A and B allowed by L-shaped lobes 36 are graphically presented. It will be readily apparent from a comparison between dimensions A and B of FIG. 6, on the one hand, and dimensions A and B of FIG. 7 on the other, that the improved lobes 36 of the present invention provide improved fuel rod to channel spacing without sacrificing or restricting coolant flow around fuel rods 40.

Referring again to FIG. 3, it can be seen that corner bands 22, 23, 24 and 25 are narrower than side bands 18, 19, 20 and 21. Moreover, as illustrated by corner band 22 in FIG. 3, the corner bands are offset so as to be spaced from leg 38 of L-shaped lobe 36. Each of the corner bands is provided with a pair of protrusions 41 which limit the contact area with the corner fuel rod so as to minimize restriction of coolant flow between the fuel rod and the corner band. The corner bands may be secured to the side bands by a weld.

As will be evident from the foregoing description, certain aspects of the invention are not limited to the particular details of the construction of the example illustrated, and it is contemplated that various other modifications or applications will occur to those skilled in the art. It is, therefore, intended that the appended claims shall cover such modifications and applications as do not depart from the true spirit and scope of the invention.

What is claimed is:

1. In a spacer for positioning at least the four corner fuel rods within a tubular flow channel of a nuclear reactor, the improvement comprising:
   a support member comprising four side bands interconnected by four corner bands to form a rigid unitary structure;
   each of said side bands having a generally L-shaped lobe adjacent each of its ends with one leg of each L-shaped lobe extending to the adjacent end of its side band;
   each of said corner bands being narrower than said side bands and being offset so as to be spaced from said one leg of each of said lobes;
   whereby said one leg of each of said lobes is positioned to engage said tubular flow channel to maintain proper spacing between said flow channel and the adjacent corner fuel rod.

2. In a spacer for positioning the fuel rods within a tubular flow channel of a nuclear reactor, said fuel rods including at least four corner rods and at least four intermediate rods, the improvement comprising:
   a support member comprising four side bands interconnected by four corner bands to form a rigid unitary structure;
   each of said side bands having a generally L-shaped lobe adjacent each of its ends with one leg of each L-shaped lobe extending to the adjacent end of its side band;
   the other leg of each L-shaped lobe being positioned in alignment with an intermediate fuel rod to define a coolant flow path around that fuel rod;

whereby said one leg of each of said lobes is positioned to engage said tubular flow channel to maintain proper spacing between said flow channel and the adjacent corner fuel rod.

3. The improvement of claim 2 wherein each of said corner bands is narrower than said side bands and is offset so as to be spaced from said one leg of each of said lobes.

* * * * *